(12) United States Patent
Katagiri et al.

(10) Patent No.: US 7,860,530 B2
(45) Date of Patent: Dec. 28, 2010

(54) SIMULTANEOUS OPERATION OF A PHOTOGRAPHING DEVICE EQUIPPED COMMUNICATION APPARATUS

(75) Inventors: Yoshito Katagiri, Hachioji (JP); Koichiro Murakami, Hachioji (JP)

(73) Assignee: Konica Corporation, Tokyo (JP)

( * ) Notice: Subject to any disclaimer, the term of this patent is extended or adjusted under 35 U.S.C. 154(b) by 600 days.

(21) Appl. No.: 11/987,072

(22) Filed: Nov. 27, 2007

(65) Prior Publication Data

US 2008/0088708 A1    Apr. 17, 2008

Related U.S. Application Data

(63) Continuation of application No. 10/254,778, filed on Sep. 26, 2002, now abandoned.

(30) Foreign Application Priority Data

Oct. 3, 2001    (JP) .............................. 2001-307386

(51) Int. Cl.
*H04M 1/00* (2006.01)
*H04N 5/232* (2006.01)

(52) U.S. Cl. ................. 455/556.1; 455/296; 348/14.02; 348/224.1

(58) Field of Classification Search ................. 455/63.1, 455/556.1, 557, 296; 348/14.01, 14.02, 14.04, 348/224.1, 333.01
See application file for complete search history.

(56) References Cited

U.S. PATENT DOCUMENTS

| | | | |
|---|---|---|---|
| 6,775,361 B1 * | 8/2004 | Arai et al. ................. | 379/93.17 |
| 6,823,198 B2 * | 11/2004 | Kobayashi ............... | 455/556.1 |
| 2003/0030740 A1 * | 2/2003 | Tsujino ................. | 348/333.01 |

FOREIGN PATENT DOCUMENTS

| | | |
|---|---|---|
| EP | 0 954 150 A2 | 11/1999 |
| JP | 2000 152217 | 5/2000 |
| JP | 2001 186488 | 7/2001 |
| WO | WO 01/65827 | 9/2001 |

* cited by examiner

*Primary Examiner*—Blane J Jackson
(74) *Attorney, Agent, or Firm*—Finnegan, Henderson, Farabow, Garrett & Dunner, L.L.P.

(57) ABSTRACT

A communication apparatus has: a communication unit for performing a wireless communication with an external device; a device for performing a predetermined operation; a drive unit for driving the device; and a control unit for putting restrictions on one of the wireless communication with the external device by the communication unit and the predetermined operation of the device driven by the drive unit, while the other is being performed.

4 Claims, 9 Drawing Sheets

| LENS DRIVE FLAG ||
|---|---|
| 0 | NOT DRIVING LENS |
| 1 | DRIVING LENS |

| COMMUNICATION FLAG ||
|---|---|
| 0 | NOT COMMUNICATING |
| 1 | COMMUNICATING |

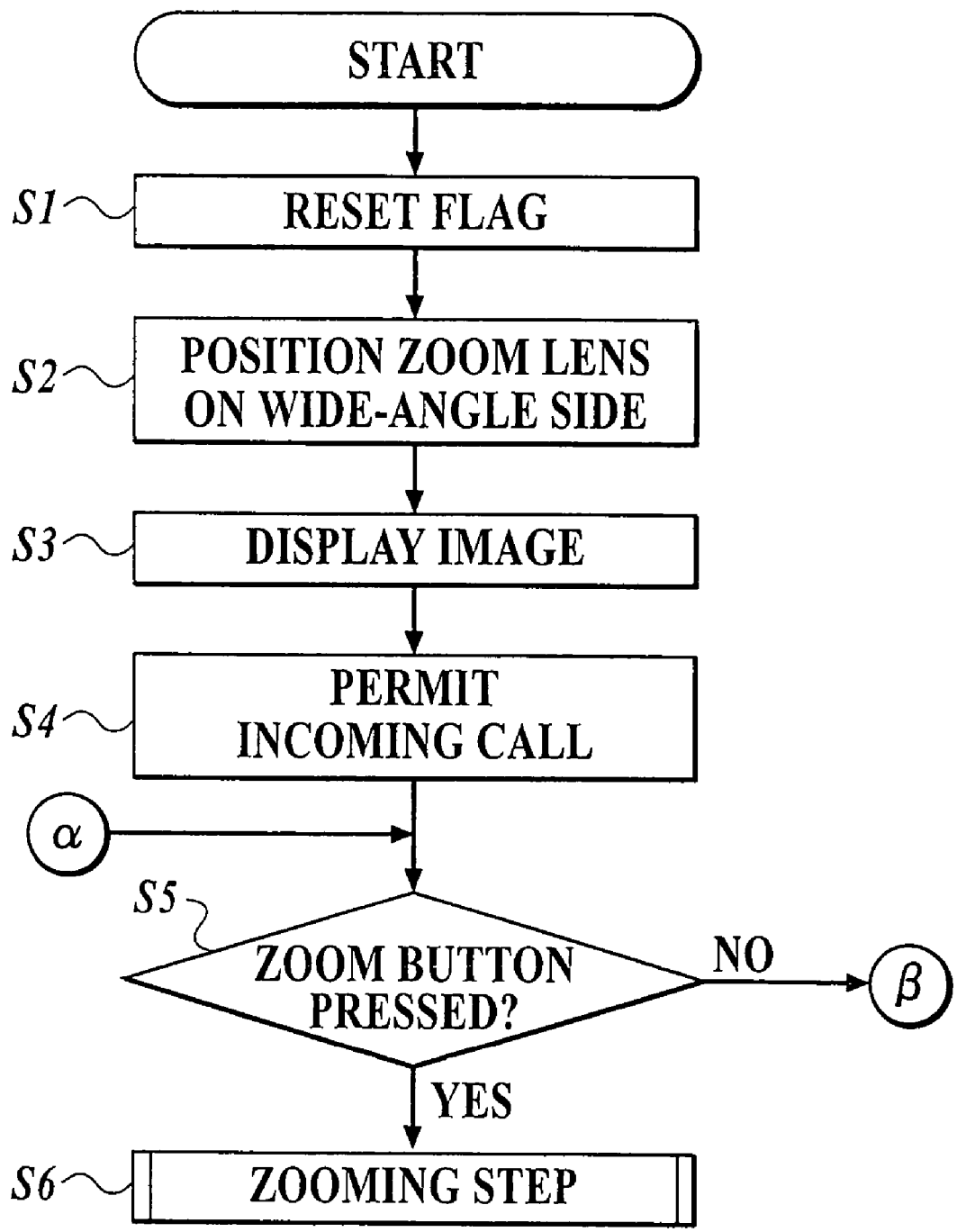

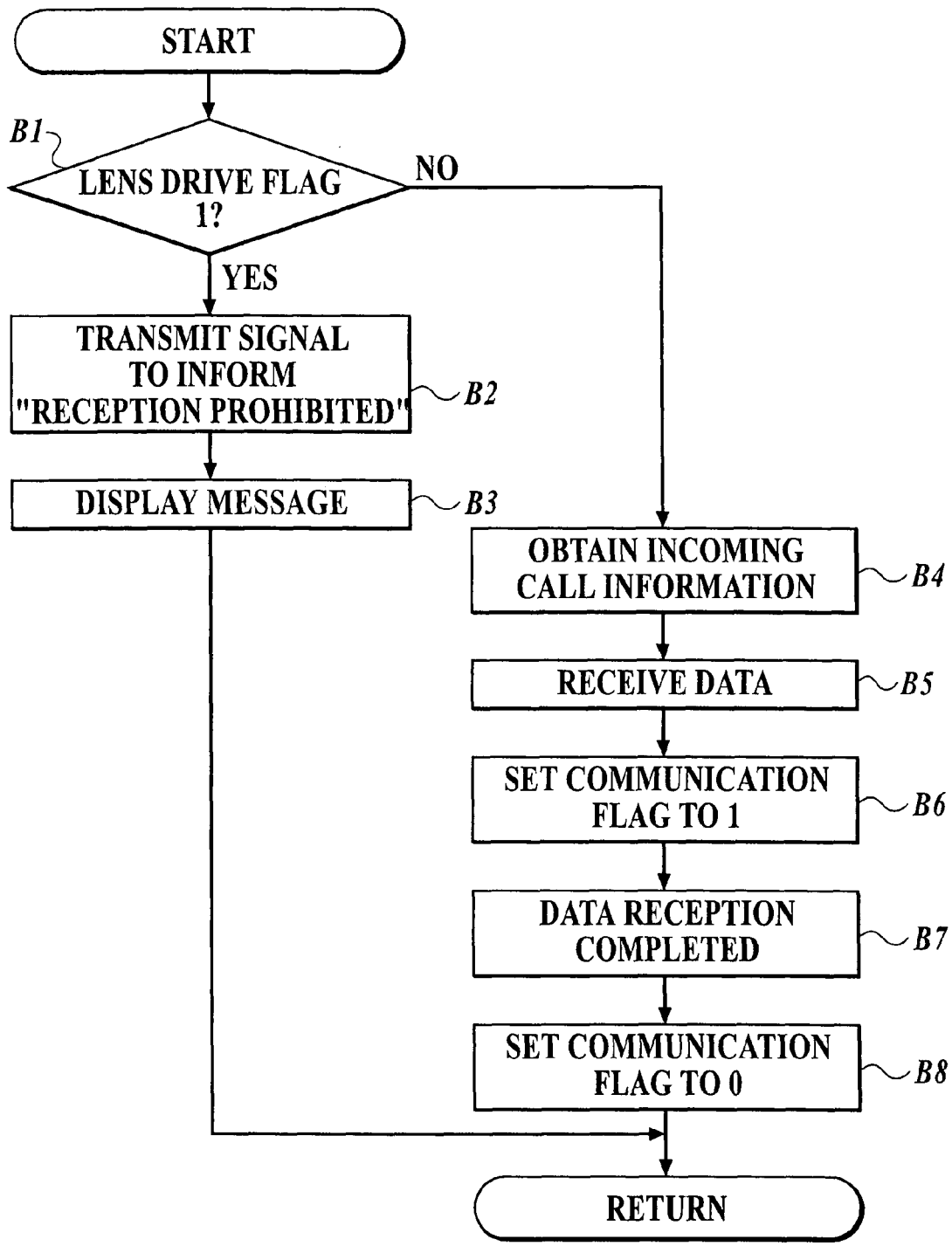

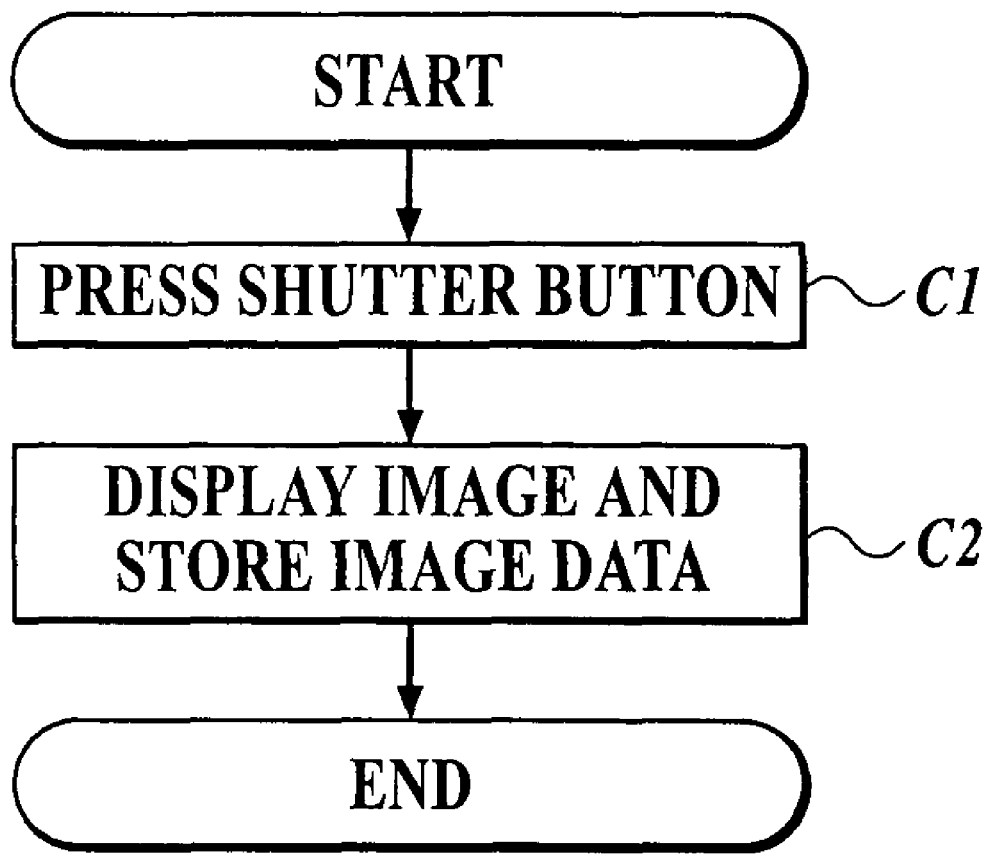

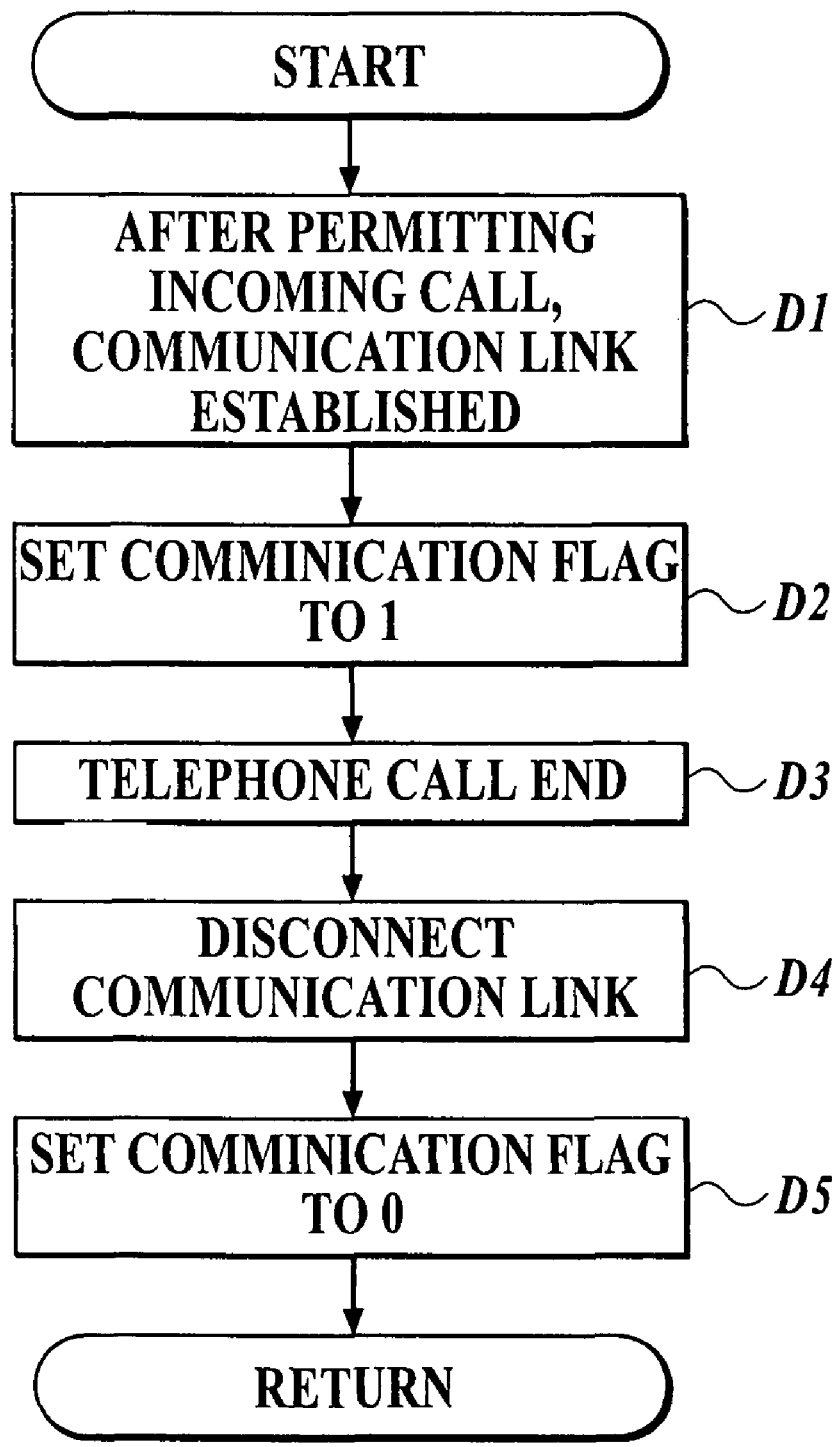

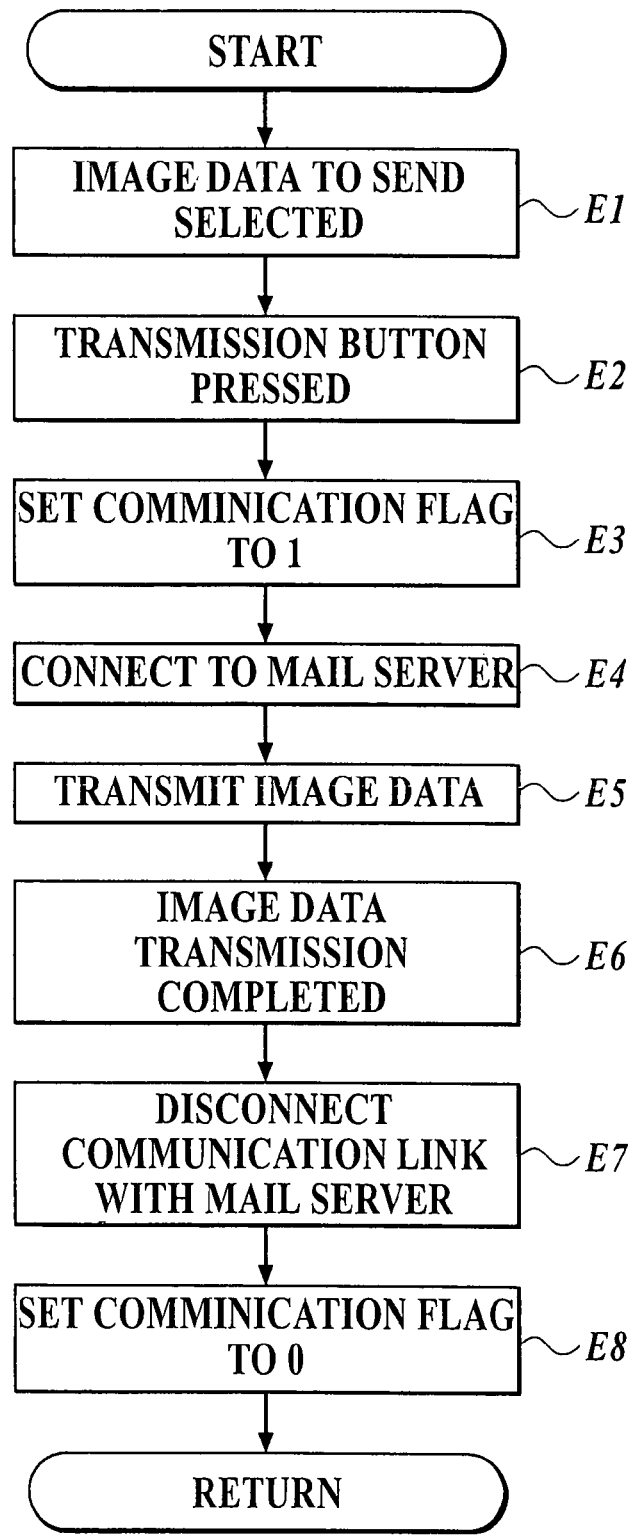

SIMULTANEOUS OPERATION OF A PHOTOGRAPHING DEVICE EQUIPPED COMMUNICATION APPARATUS

This is a continuation of application Ser. No. 10/254,778, filed Sep. 26, 2002 now abandoned and Priority of Application No. 2001-307386, filed on Oct. 3, 2001 in Japan is claimed Under 35 U.S.C. §119, all of which are incorporated herein by reference.

BACKGROUND OF THE INVENTION

1. Field of the Invention

The present invention relates to a wireless communication apparatus.

2. Description of Related Art

In recent years, with an increase in use of portable communication devices such as cellular phone and PHS (Personal Handyphone System), and with the widespread use of digital cameras, camera-equipped portable communication devices have gained in popularity.

In the camera with which the above-described communication device is equipped, a lens unit and a CCD (Charge Coupled Device) are unified and fixed in the same substrate. Therefore this kind of camera does not allow the lens to move under camera operation. If function as zooming and/or focusing is added to the above-described communication device in order to improve the performance of the camera, a variety of problems can occur because a lens drive unit and a communication unit are designed separately.

For instance, driving a zoom lens and/or a focus lens by the lens drive unit causes noise by sound of operation of an actuator with which the lens drive unit is equipped. In particular, if the countermeasures against noise are neglected in wireless communications devices, a communication error may occur and there may be difficulty in catching sound via speaker. This leads to deterioration in the quality of communication. Other than driving of the lens, a wide variety of problems related to noise caused by driving of an actuator can arise in the wireless communication devices.

SUMMARY OF THE INVENTION

In order to solve the above-described problems, an object of the present invention is to improve the quality of the wireless communication by reducing the noise while wireless communication is performed.

That is, in accordance with the present invention, the communication apparatus, comprises:

a communication section for performing a wireless communication with an external device;

a device for performing a predetermined operation;

a drive section for driving the device; and a control section for putting restrictions on one of the wireless communication with the external device by the communication section and the predetermined operation of the device driven by the drive section, while the other is being performed.

The communication apparatus may further comprise an instruction section for instructing driving of the device by the drive section; wherein the control section puts restrictions on the predetermined operation of the device driven by the drive section, when an instruction for driving the device is given by the instruction section while the wireless communication with the external device is established.

The communication apparatus may further comprise a communication determination section for determining whether the wireless communication with the external device is being established; wherein the communication determination section determines whether the wireless communication with the external device is being established when driving of the device is instructed by the instruction section.

The communication apparatus may further comprise a display section for displaying a message which shows that the wireless communication with the external device is being performed, when the communication determination section determines that the wireless communication with the external device is being established when driving of the device is instructed by the instruction section.

The control section puts restrictions on the wireless communication with the external device by the communication section, when the device is being driven by the drive section when the communication connection to the external device is required from the external device.

The communication apparatus may further comprise a driving determination section for determining whether the device is being driven by the drive section; wherein the driving determination section determines whether the device is being driven by the drive section when the communication connection to the external device is required from the external device.

The communication apparatus may further comprise a transmit section for transmitting information based on the determination by the driving determination section, to the external device, when the driving determination section determines that the device is being driven by the drive section when the communication connection to the external device is required from the external device.

The information based on the determination shows that the communication connection to the external device is restricted.

The information based on the determination shows that the device is being driven by the drive section.

The communication apparatus may further comprise a display section for displaying a message which shows that the communication connection to the external device is required from the external device, when the driving determination section determines that the device is being driven by the drive section when the communication connection to the external device is required from the external device.

According to the present invention, since one of the wireless communication with the external device by the communication section and the operation driven by the drive section should be restricted while the other is being performed, the noise caused by the operation driven by the drive section can be reduced while the wireless communication is being performed. This makes it possible to improve the quality of the wireless communication.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIGS. 3A and 3B show a flow chart for explaining a basic operation of the camera-equipped portable phone;

FIG. 5 shows a flow chart for explaining an incoming reception step which is carried out when an incoming signal is received;

FIG. 6 shows a flow chart for explaining a photographing step S8 of FIGS. 3A and 3B;

FIG. 7 shows a flow chart for explaining an outgoing call step S10 of FIGS. 3A and 3B; and FIG. 8 shows a flow chart for explaining a data transmitting step S12 of FIGS. 3A and 3B.

PREFERRED EMBODIMENT OF THE INVENTION

Hereinafter, an embodiment of the present invention will be explained in detail with reference to the drawings. Firstly, the structure of the embodiment will be explained.

Figure 1:
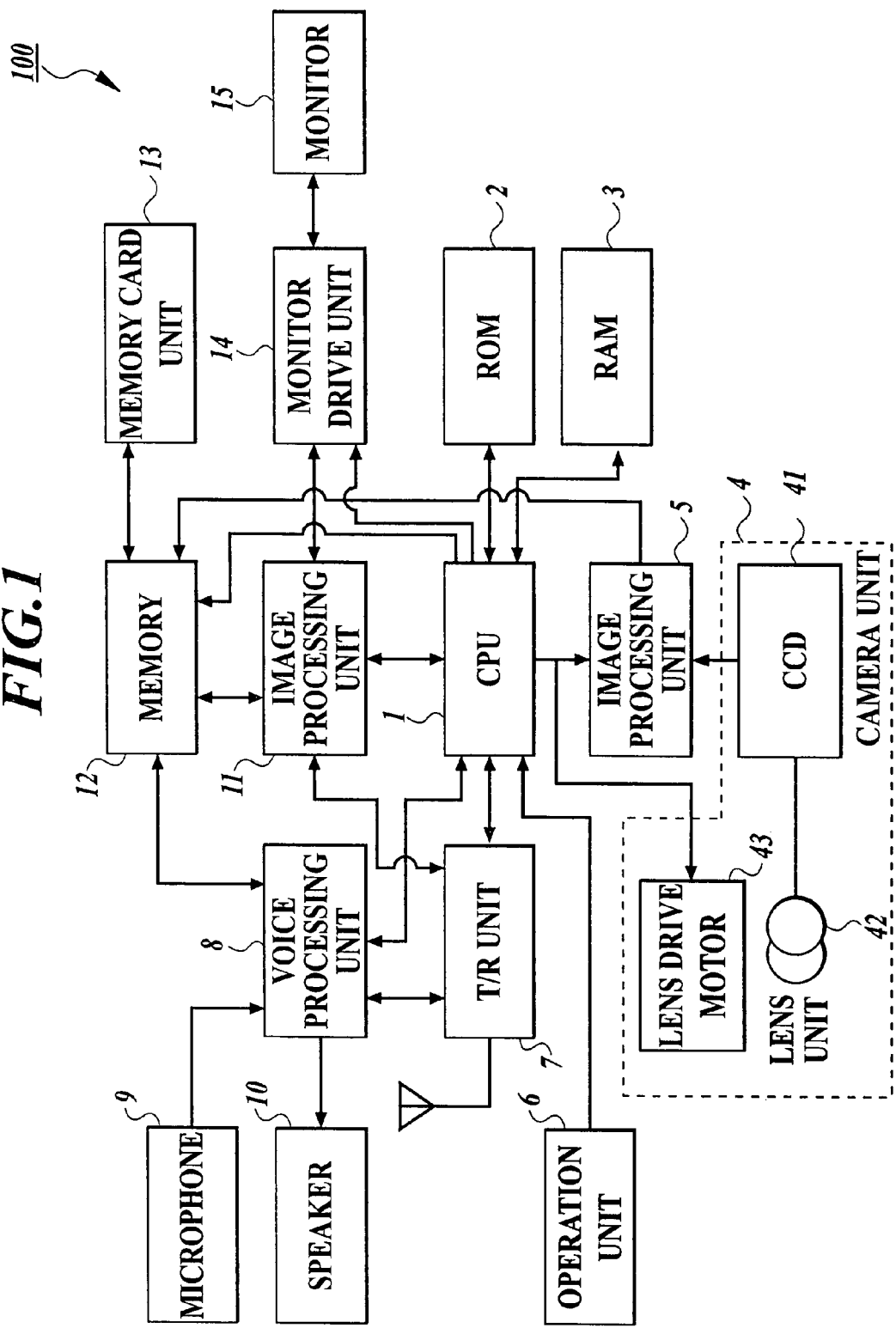
FIG. 1 is a block diagram showing a structure of a camera-equipped portable phone to which the present invention is applied.

FIG. 1 is a block diagram showing the structure of a camera-equipped portable phone 100 to which the present invention is applied. As shown in FIG. 1, the camera-equipped portable phone 100 comprises a central processing unit (CPU) 1, a read only memory (ROM) 2, a random access memory (RAM) 3, a camera unit 4, an image processing unit 5, an operation unit 6, a transmission/reception (T/R) unit 7, a voice processing unit 8, a microphone 9, a speaker 10, an image processing unit 11, a memory 12, a memory card unit 13, a monitor drive unit 14 and a monitor 15.

The CPU 1 controls each unit of the camera-equipped portable phone 100 according to various kinds of processing programs stored in the ROM 2.

To be more precise, when zooming operation is requested by pressing a zoom button in the operation unit 6, the CPU 1 determines whether the communication link with external terminal as external device is being established, in accordance with a communication flag value stored in the RAM 3. Provided the communication link with the external terminal is being established, the CPU 1 does not permits the lens unit 42 to move by not outputting a control signal for driving the lens unit 42 to the lens drive motor 43 (shown in FIG. 4).

Moreover, when an incoming signal is received from an external terminal, the CPU 1 determines whether the lens drive motor 43 is operating. Provided the lens drive motor 43 is operating, the CPU 1 controls the T/R unit 7 so that the T/R unit 7 can send a signal which shows the communications between the camera-equipped portable phone 100 and the external terminal are not permitted, to the external terminal. In this case, the CPU 1 also controls the monitor drive unit 14 so that the monitor 15 can display a message which shows that there was an incoming call from the external terminal. The CPU 1 corresponds to a control unit, a communication determination section and a driving determination section in claim.

The ROM 2 stores various kinds of processing programs carried out by the CPU 1. The ROM 2 also stores data used by these programs.

The RAM 3 has a program storage area which is used when the CPU 1 performs the processing program. The RAM 3 temporarily stores data generated in the course of executing the processing program.

Figure 2:
FIG. 2 shows contents of a communication flag and a lens drive flag stored in a RAM.

As shown in FIG. 2, the RAM 3 stores a lens drive flag which indicates whether the lens drive motor 43 is operating and a communication flag which indicates whether the communication link with an external terminal is being established. The lens drive flag value is set to "0" while the lens drive motor 43 is not operating, and is set to "1" while the lens drive motor 43 is operating. The communication flag value is set to "0" when the communication link with the external terminal is not established, and is set to "1" when the communication link with the external terminal is established.

The camera unit 4 comprises a CCD 41, the lens unit 42, the lens drive motor 43, and the like.

The CCD 41 converts an optical image signal picked up by the lens unit 42 into an electrical signal (analogue signal). This electrical signal is converted to a digital image signal by an A/D converter (not shown).

The lens unit 42 which has optical elements such as a zoom lens, a focus lens and a blur correction lens, operates under the control of the lens drive motor 43. The zoom lens is for varying focal length of the lens by moving the lens along the optical axis. The focus lens is for focusing by moving the lens along the optical axis. The blur correction lens is for correcting the blurring by moving the lens in the direction perpendicular to the optical axis or in the direction out of perpendicular to the optical axis. The lens unit 42 may have two or more functions with one lens. Moreover, the lens unit 42 may have only a function of zooming or only a function of focusing or only a function of the blur correction. Alternatively, two or more combination of these functions can be available in the lens unit 42. The lens unit 42 corresponds to a device which performs a predetermined operation in claim.

The lens drive motor 43 which consists of actuators, such as a step motor and a direct current (DC) motor, drives the lens unit 42 in accordance with an control signal inputted from the CPU 1. The lens drive motor 43 corresponds to a drive unit.

The image processing unit 5 performs an image processing operation such as compression on the image signal inputted from the A/D converter and outputs the signal on which the image processing was performed, to the memory 12.

The operation unit 6 comprises a call button, a camera mode button, an e-mail button, an image selection button, a zoom button, a ten-key keypad, a cursor key, a power button, a shutter button, a transmission button, and the like. The operation unit 6 outputs an operation signal corresponding to the operation of each of these buttons and keys, to the CPU 1. Here, the image selection button is for selecting an image data to send by e-mail. The operation unit 6 corresponds to an instruction section in claim.

The T/R unit 7 implements communication protocol for handling communication with a base station (not shown) connected to a public phone network. The T/R unit 7 controls the communication such as the data communication and the phone call, by employing the set-up communication channel.

The T/R unit 7 performs a processing such as modulation on the image signal and the voice signal which are inputted from the image processing unit 11 and the voice processing unit 8, respectively, and transmits the signal on which the processing was performed, to the external terminal, through an antenna. Moreover, the T/R unit 7 performs a processing such as demodulation on the signal received through the antenna. The T/R unit 7 outputs the image signal and the voice signal on which the processing such as modulation, to the image processing unit 11 and the voice processing unit 8, respectively.

When an incoming signal is received, the T/R unit 7 outputs a notice signal to the CPU 1 to notify the CPU 1 of reception of the incoming signal. When communication link with an external terminal is established, the T/R unit 7 outputs a notice signal to the CPU 1 to notify the CPU 1 of establishment of the communication. When the communication link with the external terminal is disconnected, the T/R unit 7 outputs a notice signal to the CPU 1 to notify the CPU 1 of disconnection of the communication link. The T/R unit 7 corresponds to a communication unit and a transmit unit.

The voice processing unit 8 converts the digital voice signal inputted from the T/R unit 7, to an analogue voice signal by a D/A converter (not shown), and outputs the analogue signal to the speaker 10. Also, the voice processing unit 8 converts an analogue voice signal inputted from the microphone 9, to a digital voice signal by an A/D converter (not shown), and outputs the digital voice signal to the T/R unit 7.

The microphone 9 changes sound inputted from the outside into a voice signal, and outputs the voice signal to the voice processing unit 8. The speaker 10 amplifies the voice signal inputted from the voice processing unit 8, and outputs the amplified voice to the outside.

The image processing unit 11 performs an image processing operation such as compression on the image data inputted from the T/R unit 7, and outputs the image data on which the image processing was performed, to the memory 12. Also, when reproduction of the image data stored in the memory 12 is required, the image processing unit 11 performs an image processing operation such as expansion on the image data which is read from the memory 12, and outputs the image data on which the image processing was performed, to the monitor drive unit 14.

The memory 12 temporarily stores the image data inputted from the image processing unit 5, the voice data inputted from the voice processing unit 8 and the image data inputted from the image processing unit 11. Also, the memory 12 temporarily stores the voice data and the image data which are read from the memory card unit 13. Moreover, the memory 12 stores telephone book data which are manually entered by user, call history data, and the like. Also, the memory 12 stores the image data which is inputted from the image processing unit 5, together with the data of an attached file, destination e-mail address and associated telephone number, in response to the operation in the operation unit 6.

The memory card unit 13 comprises a removable memory card such as SD (Secure Digital) memory card (registered trademark). The data stored in the memory 12 is written on the memory card.

The monitor drive unit 14 drives the monitor 15 in accordance with a control signal inputted from the CPU 1. The monitor 15 which is comprising a LCD (Liquid Crystal Display) displays various kinds of information under the control of the monitor drive unit 14. In the camera mode in which photographs can be taken, the monitor 15 also functions as a viewfinder which displays an image captured by the camera unit 4. The monitor drive unit 14 and the monitor 15 correspond to a display section in claim.

Next, the operation of the embodiment will be explained. In the beginning, with reference to the flow chart shown in FIGS. 3A and 3B, the basic operation of the camera-equipped portable phone 100 will be explained.

When the power of the camera-equipped portable phone 100 is switched on by pressing the power button in the operation unit 6, the CPU 1 resets the values of the lens drive flag and the communication flag which are stored in the RAM 3 (Step S1). In step S1, the values of the lens drive flag and the communication flag are reset to 0.

Next, the CPU 1 controls the lens drive unit 43 so that the zoom lens in the lens unit 42 can be positioned on the wide-angle side (Step S2). Then, the CPU 1 drives the CCD 41 and the monitor drive unit 14 so that the monitor 15 displays the image captured by the camera unit 4 (Step S3). From this time, the CPU 1 begins to wait for the reception of an incoming signal, and the interruption by the incoming call can be permitted until the power is shut off (Step S4).

The CPU 1 is waiting for an operation signal corresponding to the operation of each of these buttons and keys in the operation unit 6 (Step S5, S7, S9, S11). When the zoom button is pressed (Step S5; YES), the CPU 1 shifts to the zooming step S6 (shown in FIG. 4), as described later. When the shutter button is pressed (Step S7; YES), the CPU 1 shifts to the photographing step S8 (shown in FIG. 6), as described later.

When the call button is pressed after a destination telephone number is entered by the ten-key (Step S9; YES), the CPU 1 shifts to the outgoing call step S10 (shown in FIG. 7), as described later. When the e-mail button is pressed (Step S11; YES), the CPU 1 shifts to the data transmitting step S12 (shown in FIG. 8), as described later.

When the power is shut off by pressing the power button (Step S13; YES), the CPU 1 prohibits the interruption by the incoming call and terminates waiting for the reception of the incoming signal (Step S14). At this time, the CPU 1 also controls the monitor drive unit 14 to terminate the displaying on the monitor 15 (Step S15), and controls the lens drive motor 43 to puts each of the lenses of the lens unit 42 on the original position, on which the lenses of the lens unit 42 were located before the power of the camera-equipped portable phone 100 is switched on. Then, the basic operation of the camera-equipped portable phone 100 is finished.

Figure 3B:
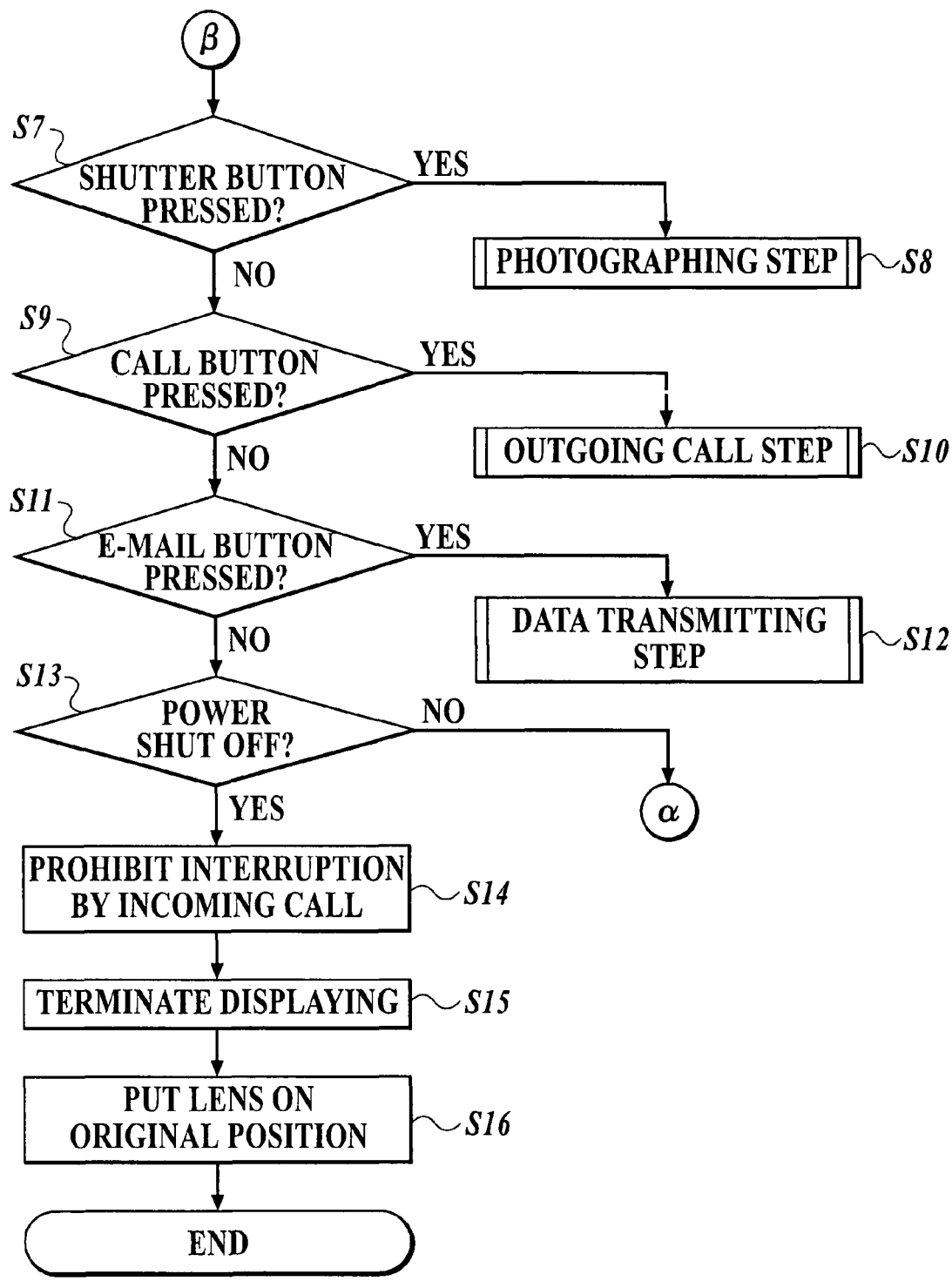

Next, with reference to the flow chart shown in FIG. 4, the zooming step S6 of FIGS. 3A and 3B, will be explained.

First of all, the CPU 1 checks the communication flag stored in the RAM 3 and determines whether the communication flag value is 0 (Step A1). In step A1, if the communication flag value is set to 1 (Step A1; NO) by performing the outcall call step S10 (FIG. 7) and the data transmitting step S12 (FIG. 8), the CPU 1 drives the monitor drive unit 14 so that monitor 15 displays a message which shows that the camera-equipped portable phone 100 is communicating with an external terminal (Step A2).

In step A1, if the communication flag is 0 (Step A1; YES), the CPU 1 determines whether the zooming operation is requested by pressing the zoom button (Step A3). Provided the zooming operation is requested in the step A3 (Step A3; YES), the CPU 1 drives the lens drive motor 43 in accordance with the operation of the zoom button (wide-angle or telephoto) (Step A4) and sets the lens drive flag value to 1 (Step A5). The determination in step A3 can be omitted.

Next, the CPU 1 determines whether the zooming operation is terminated by pressing the zoom button (Step A6). Assuming that the zooming operation is terminated in step A6 (Step A6; YES), the CPU 1 stops driving the lens drive motor 43 (Step A7) and sets the lens drive flag value to 0 (Step A8). Then the zooming step is finished.

Next, with reference to the flow chart shown in FIG. 5, the incoming reception step carried out when the CPU 1 receives an incoming notice signal, will be explained. In the flow chart shown in FIG. 5, the incoming reception step carried out when an incoming signal corresponding to an e-mail is received, will be explained. The incoming reception step shown in FIG. 5 will be performed in parallel with other step such as the zooming step (FIG. 4), the photographing step (FIG. 6), the outgoing call step (FIG. 7) and the data transmission step (FIG. 8).

When the incoming notice signal is inputted from the T/R unit 7, the CPU 1 checks the lens drive flag stored in the RAM 3 and determines whether the lens drive flag value is 1 (Step B1).

In step B1, if the lens drive flag value is set to 1 (Step B1; YES) by performing the zooming step (FIG. 4), the CPU 1 controls the T/R unit 7 so that the T/R unit 7 transmits a signal to the sender (caller) terminal to inform that the camera-equipped portable phone 100 prohibits the reception from the external terminal (Step B2). Next, the CPU 1 controls the monitor drive unit 14 so that the monitor 15 displays the message which shows that there was an incoming call (Step B3).

In step B1, if the lens drive flag is 0 (Step B1; NO), the CPU 1 obtains the incoming information (Step B4) and starts to receive the data from the sender terminal (Step B5). If the data reception is started, the CPU 1 sets the communication flag value to 1 (Step B6).

When the data reception is completed (Step B7), the CPU 1 sets the communication flag value to 0 (Step B8) and permits the camera mode setting. Then, the incoming reception step is finished.

Not only while the lens drive motor 43 is operating as shown in the flow chart in FIG. 5, but also while the communication link with the external terminal is being established, the interruption by the incoming call can be prohibited (like the conventional portable phone). Moreover, when the lens drive flag value is set to 0 by terminating the operation of the lens drive motor 43 after the incoming call is prohibited, it will be appreciated that the camera-equipped portable phone 100 transmits a signal to the sender terminal to request that the terminal should resend the data. This makes it possible to prevent failing to get e-mail from the sender terminal.

Additionally, instead of transmitting the signal to the sender terminal to inform that reception is prohibited as shown in step B2, it should be possible to transmit a signal to the sender terminal to inform that the lens drive motor 43 is operating. This makes it possible to inform the user of the sender terminal that the camera-equipped portable phone 100 prohibits the reception from the external terminal. In this case, the same advantages as the above statement can also be acquired.

Next, with reference to the flow chart shown in FIG. 6, the photographing step S8 of FIGS. 3A and 3B will be explained.

When the shutter button is pressed (Step C1), the CPU controls the monitor drive unit 14 so that the monitor 15 displays the image data captured by the camera unit 4 for a predetermined time. At the same time, the CPU 1 stores the image data in the memory 12 (Step C2). Then, the photographing step is finished. Here, the memory 12 stores the image, together with the data of an attached file, destination e-mail address and associated telephone number, in response to the operation in the operation unit 6.

Next, with reference to the flow chart shown in FIG. 7, the outgoing call step in step S10 of FIGS. 3A and 3B will be explained.

If the call button is pressed after a destination telephone number is entered by the ten-key, the T/R unit 7 transmits an outgoing signal to the external terminal via the base station. If the external terminal permits the incoming call from the camera-equipped portable phone 100, communication link between the external terminal and the camera-equipped portable phone 100 is established (Step D1), the camera-equipped portable phone 100 goes to the telephone call state. When the communication link with external terminal is established, the CPU 1 sets the communication flag value to 1 (Step D2).

When the telephone call ends by pressing the call button again (Step D3), the communication link with the external terminal is disconnected (Step D4). When the communication link with the external terminal is disconnected, the CPU 1 sets the communication flag to 0 (Step D5). Then, the outgoing call step is finished.

Next, with reference to the flow chart shown in FIG. 8, the data transmitting step S12 of FIGS. 3A and 3B will be explained. In flow chart of FIG. 8, an image data transmitting step will be explained as an example of the data transmission.

When the image selection button is pressed after the e-mail button is pressed, the CPU 1 controls the monitor drive unit 14 so that the monitor 15 displays the selection page for selecting an image data to send by e-mail from the image data stored in the memory 12. Then, the image data to send by e-mail is selected by the operation of the operation unit 6 (Step E1).

Next, when the transmission button is pressed after selecting the destination e-mail address (Step E2), the CPU 1 sets the communication flag value to 1 (Step E3). When the communication flag value is set to 1, the T/R unit 7 connects the camera-equipped portable phone 100 to the public phone network via the base station. Then the camera-equipped portable phone 100 is connected to a mail server (Step E4).

When the camera-equipped portable phone 100 is connected to a mail server, the T/R unit 7 starts to transmit the image data selected in step E1 to the external terminal corresponding to the destination e-mail address (Step E5). When the data transmission is completed (Step E6), the T/R unit 7 disconnected the communication link with the mail server (Step E7). When the communication link with the mail server is disconnected, the T/R unit 7 outputs a notice signal to the CPU 1 to notify the CPU 1 of the disconnection. Then the CPU 1 sets the communication flag value to 0 in accordance with the notice signal (Step E8). Then the data transmitting step is finished.

According to the camera-equipped portable phone 100 to which the present invention is applied, the operation of the lens unit 42 under the control of the lens drive motor 43 is prohibited when the communication link with the external terminal is established. This makes it possible to protect radio signal from the noise caused by the operation of the lens drive motor 43. Therefore the excellent wireless communication is ensured.

Moreover, the interruption from the external terminal is prohibited while the lens unit 42 is operating under the operation of the lens drive motor 43. Thus, by not performing simultaneously the lens drive operation and the communication with an external terminal, the communication quality can be enhanced.

Although one specific embodiment of the present invention has been described, various changes and modifications may be made by those skills in the art without departing from the spirit and scope of the present invention.

Figure 4:
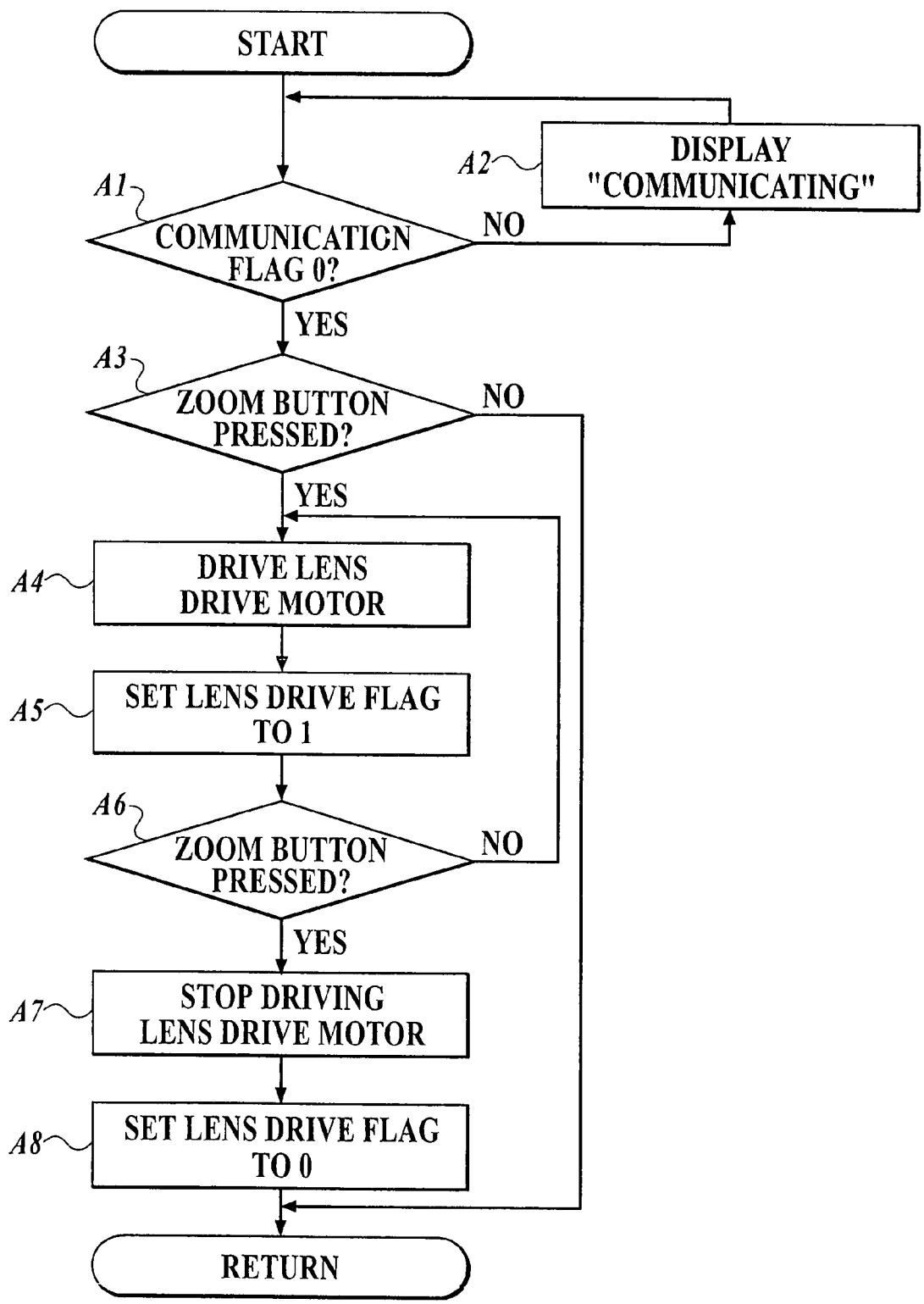
FIG. 4 shows a zooming step S6 of FIGS. 3A and 3B.

For example, although the flow chart of FIG. 4 shows that the zooming operation is prohibited while the camera-equipped portable phone 100 is communicating with the external terminal, the focusing operation and the blur correction operation can also be prohibited under the same condition.

Moreover, in the above-described embodiment, while one of wireless communication with an external terminal and driving of the lens unit 42 by the lens drive motor 43 is being performed, the other is totally prohibited. However, it should be possible to perform the wireless communication and the lens operation simultaneously if one of them performs under a predetermined restriction. For example, while the camera-equipped portable phone 100 is communicating with the external terminal, the lens unit 42 can be driven if the motor speed of the lens drive motor 43 is lowered so that the noise may not occur. Furthermore, while the lens drive motor 43 is driving the lens unit 42, data communication can be performed if clock frequency in the data communication is lowered so that the noise may not occur.

Moreover, in the above-described embodiment, driving by the lens drive motor 43 is prohibited until the communication with the external terminal is over. However, if the driving of the lens unit is requested while the camera-equipped portable phone 100 is communicating with the external terminal, it is possible to stop the communication and start the driving of the lens unit 42. In this case, after the driving of the lens unit 42 is over, the communication with the external terminal is started again.

Although the above embodiment shows that a drive section in claim (to be described) is applied to the lens drive motor 43, the drive section in claim can be applied to other part of the camera-equipped portable phone 100.

For example, the drive section in claim can be applied to a drive unit for driving mechanical aperture to give an appropriate light exposure to the CCD 41 while photographing or for driving shutter. If the camera-equipped portable phone 100 is folding type, the drive section in claim can be applied to a drive unit for driving the folding operation. Moreover, the drive section in claim can be applied to a drive unit for driving an electric motor-driven type antenna or for loading and ejecting of a memory card in the memory card unit 13. Furthermore, the drive section in claim can be applied to a drive unit for moving a barrier which covers the lens unit 42.

Although the above-described embodiment shows the present invention is applied to the portable phone, the present invention can also be applied to other wireless communication apparatus such as PHS.

The entire disclosure of Japanese Patent Application No. Tokugan 2001-307386 filed on Oct. 3, 2001 including specification, claims drawings and summary are incorporated herein by reference in its entirety.

What is claimed is:

1. A photographing device-equipped communication apparatus, comprising:
    a communication section to wirelessly communicate with an external device;
    a drive section to drive a mechanical part executing a camera-related operation; and
    a control section to simultaneously perform the wireless communication of the communication section and the driving operation of the drive section while putting a predetermined restriction on one of the wireless communication and the driving operation.

2. The photographing device-equipped communication apparatus of claim 1, wherein the drive section is a lens drive motor.

3. The photographing device-equipped communication apparatus of claim 1, wherein the predetermined restriction is to lower a motor speed of the lens drive motor when the lens drive motor is operating to an extent that noise does not occur.

4. The photographing device-equipped communication apparatus of claim 1, wherein the predetermined restriction is to lower a clock frequency of data receiving from the external device when the communication section wirelessly communicates with the external device to an extent that noise does not occur.

* * * * *